No. 857,326. PATENTED JUNE 18, 1907.
E. R. BUCKWALTER.
WINDLASS ATTACHMENT.
APPLICATION FILED JUNE 10, 1905.

Witnesses
G. R. Thomas
E. M. Oxford

Inventor
E. R. Buckwalter
By Chandler & Chandler
Attorneys

UNITED STATES PATENT OFFICE.

ELLIOTT ROY BUCKWALTER, OF LAURENS, IOWA.

WINDLASS ATTACHMENT.

No. 857,326.  Specification of Letters Patent.  Patented June 18, 1907.

Application filed June 10, 1905. Serial No. 264,690.

*To all whom it may concern:*

Be it known that I, ELLIOTT ROY BUCKWALTER, a citizen of the United States, residing at Laurens, in the county of Pocahontas, State of Iowa, have invented certain new and useful Improvements in Windlass Attachments; and I do hereby declare the following to be a full, clear, and exact description of the invention, such as will enable others skilled in the art to which it appertains to make and use the same.

This invention relates to windlasses for vehicles.

One object of the invention is to provide the portable or wheeled support of a threshing machine with a windlass for the carrying of a chain, rope or other cable for use in the event that the engine or machine becomes stalled in the roadway.

Another object of the invention resides in the provision of an exceedingly simple, inexpensive, durable and efficient windlass for detachable association with a traction engine for the purpose named.

With these and other objects in view, the invention consists in the combination and arrangement of parts as will be hereinafter more fully described, shown in the accompanying drawings, and particularly pointed out in the appended claims, it being understood that changes in the form, proportion, size and minor details may be made, within the scope of the claims, without departing from the spirit or sacrificing any of the advantages of the invention.

Figure 1:
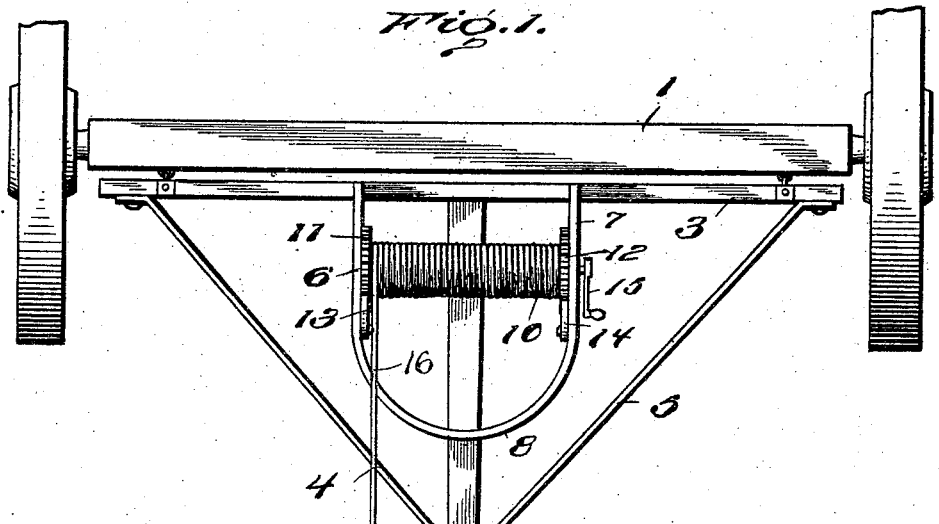
Figure 3:
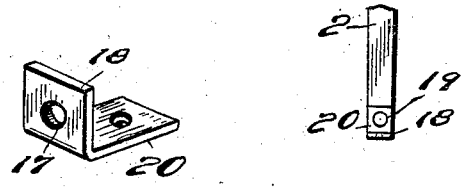
Figure 2:
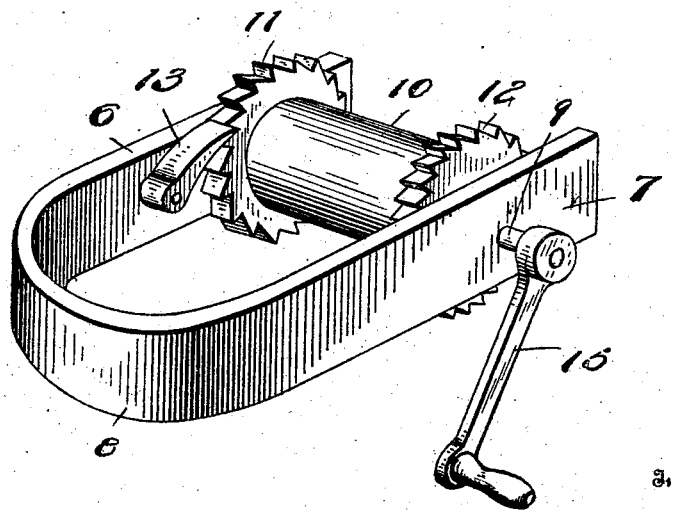

In the drawings: Figure 1 is a top plan view of the front portion of a wheeled support for a threshing machine illustrating my invention attached thereto. Fig. 2 is a detail perspective view of the U-shaped frame and the windlass mounted therein. Fig. 3 is a detail perspective view of the guide secured to the forward end of the tongue.

Referring now more particularly to the accompanying drawings, the reference character 1 designates a front axle of a wheeled support for a threshing machine having the usual tongue 2 including its rear transverse cross member 3 and side braces 4 and 5 secured thereto in any suitable manner.

Secured in any suitable manner to the cross piece 3 of the tongue are the free bifurcated ends of the legs 6 and 7 of a U-shaped metallic, wooden or other frame whose bight portion 8 rests upon the upper face of the tongue 2. Journaled in the legs 6 and 7 of the said U-shaped member is a shaft 9 carrying a roller 10 upon each end of which is disposed a ratchet wheel 11 and 12, there being pawls 13 and 14 pivotally secured in any suitable manner to the inner faces of the legs 6 and 7 respectively for engagement with the teeth of the corresponding ratchet wheels to prevent backward movement of the latter. It will be observed that the ends of the shaft 9 extend through the corresponding legs 6 and 7 and that a crank 15 is secured to one end of the shaft for rotating it and the roller 10. It will thus be understood that by reason of the bight portion 8 of the U-shaped member resting upon the face of the tongue in combination with the connection of the free ends of the legs 6 and 7 with the cross piece 3, the same is firmly supported in the front of the said wheeled support.

It will now be understood that a rope, chain or other cable may be wound upon or over the roller 10 through the instrumentality of the crank handle 15 and that the pawls 13 and 14 positively prevent backward movement of the cable.

In the event that the thresher becomes stalled in the roadway, the engine (not shown) may be removed from the machine and one end of the cable 16 for extricating the body of the machine from its stalled position, the cable passing through a guide opening 17 in the upright metallic or other suitable member 18 which is secured upon the outer end of the tongue by means of a bolt or other suitable element 19 piercing the foot 20 of the support and the tongue the free end of the rope being secured to the tongue 2 in any suitable manner. By reason of passing the cable 16 through the opening or eye 17 of the upright 18, the tongue is held in alinement with the cable or the cable with the tongue, and consequently holding both the tongue and cable in alinement with the engine.

A chain, rope or cable is very bulksome and heavy to lift or carry from place to place; and therefore it will be seen that my invention obviates the necessity of carrying the cable loosely from place to place in that I provide means associated with the machine for carrying the cable upon which it may be wound or from which it may be drawn for the purposes stated.

What is claimed is:

The combination, with the axle of a portable threshing machine, and the tongue provided with a cross-bar through the intervention of which the tongue is connected to the axle, of a U-shaped frame having the ends of its side bars or arms connected to the cross-bar and its forward end resting on the tongue, a windlass journaled in the side-bars of the frame, a crank connected with the windlass for operating the same, ratchet wheels and pawls for preventing backward turn of the windlass, and an angular plate secured on the forward end of the tongue and provided with a perforation in the upright part for guiding the cable and holding up the outer end of the tongue.

In testimony whereof, I affix my signature, in presence of two witnesses.

E. ROY BUCKWALTER.

Witnesses:
W. J. ALLEN,
D. W. BRUINS.